Jan. 16, 1968   E. L. KARLSON ET AL   3,364,066
BLACK PIGMENT FOR THE BLACKENING OF INFRARED
RADIATION DETECTORS
Filed June 30, 1964
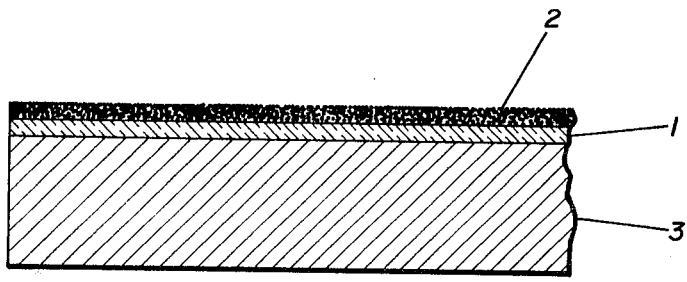
INVENTOR.
ESKIL L. KARLSON
JOSEPH V. KIERNAN
BY

United States Patent Office 3,364,066
Patented Jan. 16, 1968

3,364,066
BLACK PIGMENT FOR THE BLACKENING OF INFRARED RADIATION DETECTORS
Eskil L. Karlson, Stamford, Conn., and Joseph V. Kiernan, Yonkers, N.Y., assignors to Barnes Engineering Company, Stamford, Conn., a corporation of Delaware
Continuation-in-part of application Ser. No. 294,145, July 10, 1963. This application June 30, 1964, Ser. No. 379,335
3 Claims. (Cl. 117—215)

ABSTRACT OF THE DISCLOSURE

Infrared radiation detectors are coated with a silicon carbide pigment coating, the pigment particle sizes falling substantially in the range of 5–25$\mu$.

Cross references to related applications

This application is a continuation in part of our co-pending application Ser. No. 294,145, filed July 10, 1963, now abandoned.

Background of the invention

Radiation detectors to be used in the far infrared present very serious problems because even oxide thermistors are not completely opaque in the far infrared. Thin film germanium and silicon thermistors are almost transparent in wide ranges in the infrared, and thermocouples and thermopiles also present the problem that the very thin active junctions show insufficient absorption in the infrared, and particularly in the far infrared. It has therefore become essential to provide the infrared thermal detectors with an infrared absorbent coating. In certain regions of the infrared this is fairly simple, as there are available a number of good blacks. Unfortunately, in the far infrared, for example 35$\mu$, the absorptive power of these coatings falls off to a very serious extent, and so the problem of a suitable absorbent coating for thermal detectors remains a serious one.

Summary of the invention

Before describing the improved coating material with which the present invention deals, it is desirable to set forth certain specific requirements:

(1) The coating must be opaque in the far infrared spectrum even in quite thin films.

(2) Reflection, both spectral and diffuse, must be low throughout the infrared spectrum, including the far infrared.

(3) The coating should have as low a heat capacity as possible, so that the time constant of infrared detectors will not be seriously lengthened.

(4) The coating must not produce electrical noise when applied to a thermistor.

(5) The volume of the thinnest uniform coating must be low.

(6) Adhesion properties must be good.

(7) The coating must be capable of withstanding temperatures of at least 150° C.

(8) The coating should have good thermal conductivity. It will be noted that requirements (1), (5) and (8) are really somewhat different aspects of the same requirement, that the film be opaque and at the same time thin and hence of low thermal capacity and good thermal conductivity.

A black formed of spheres of a silicon carbide in size ranges up to 50$\mu$ has been developed and is sold by the Minnesota Mining and Manufacturing Company under their name "3M Black Velvet Coating." This material, which is obtained in the form of a dispersion in a solution of an alkyd resin binder in a solvent such as xylene, has a remarkable absorption even in the far infrared, but it does not produce an extremely thin film which is continuous and therefore does not fulfill requirements (3), (5) and (8).

The present invention deals with an improved black coating having the same chemical constitution, that is to say, the pigment spheres are chemically the same and they are dispersed in a solution of a resin in a solvent. However, the particle sizes and their range is very different, and as will be pointed out below, markedly improved results are obtained. In general the pigment particles of the present invention fall substantially in the range of 5–25$\mu$. When uniform coatings are made with the new size of pigment particles, very thin films show substantially complete absorption in the far infrared, and meet with requirements (3), (5) and (8).

According to the present invention it is not sufficient to reduce the pigment particles to the range set out above. At first glance this appears to be simple of accomplishment, requiring only evaporation of solvent to produce a dry solid which is then ground and sized. Unfortunately, the resulting powder will not redisperse in solvent to produce a coating capable of giving uniform thin films. According to the present invention in its process aspect, it has been found that if the coating solution is wet ball milled until the pigment particles are of the size range set out above, an excellent coating material is obtained. The time of ball milling, of course, depends on the nature of the equipment, batch size, and other variables. However, on the same ball mill, operated in the same manner, it can be determined what time should be used to obtain the desired product, and thereafter the manufacturing process can be simplified by using timing instead of examining the nature of the product being produced. It is an advantage of the present invention that it lends itself to such simplified manufacturing procedures.

Brief description of the drawing

The drawing is a diagrammatic section through an infrared detector.

Description of the preferred embodiments

The invention will also be described in connection with a typical ball milling procedure shown in the following example.

The drawing illustrates a thermistor at (1), a thin coating of black silicon-carbide-containing resin (2) and a heat sink (3). The drawing is diagrammatic and the thickness of the thermistor and black coating layer are greatly exaggerated for clearness in comparison to the heat sink.

Example

A dispersion of commercial 3M Black Velvet Coating in which the pigment particles are silicon carbide in a solution of alkyd resin was filled into a ball mill using stainless steel ball bearings from ¼" to ½" diameter as grinding balls. Grinding was continued until the particle size of the pigment spheres fell substantially in the range of 5–25$\mu$. The black coating thus produced, which is the product of the present invention, was then tested and compared with the original dispersion before ball milling. All coating applications were done with an air brush using 15 lb. pressure of nitrogen. The amounts of solvent are not critical and can be adjusted to produce good operating consistency. However, the two materials were tested under the same conditions.

As a test, several 1 x 1 mm. fused alumina backed oxide thermistor detectors were blackened with about 0.65 mg./cm.$^2$ of the coating. This blackening produced a uniform coating with no uncoated areas and a 60% increase in detector responsivity with a 20% increase in time constant was obtained. The measurements were taken with an infrared source in the form of a 470° K. black body in a typical bolometer setup using 15 c.p.s. chopping speed. The same thickness of the original coating material showed approximately 20% uncovered areas with a corresponding decrease in responsivity. It is, of course, possible to put on a coating of the original material so thick that there are no uncovered areas. Then, however, the volume-to-surface ratio is markedly increased, and responsivity falls off and time constant is increased.

The nature of the solvent and the resin in the coating composition are not particularly significant. The solution of an alkyd resin in xylene is a very satisfactory typical vehicle for the pigment. Any other resin solution capable of forming the necessary thin, uniform films may be used. The invention depends for its effectiveness on a uniform coating having the pigment particles in the range of 5–25µ and is not intended to be limited to any particular resin or solvent used in forming the coating.

The effect of blackening in the far infrared of the dispersed silicon carbide coating of the present invention is so great that it is effective even in mixtures of less than half of the coating of the present invention with other black coatings, for example the far infrared absorption is still maintained in mixtures containing from 20 to 25 percent of the coating material of the present invention when blended with a standard blackening as Covinyl Blak (a dispersion of carbon particles in a plasticized polyvinyl-acetate resin). In the claims the term "comprising' is used in its ordinary meaning as covering an article in which the amount of the recited element is sufficient to exert its novel effect of absorption in the far infrared.

We claim:
1. An oxide thermistor infrared radiation detector having a thin continuous uniform coating thereon of a dispersion of silicon carbide pigment particles substantially in the range of 5–25µ in a film-forming material.
2. A thermocouple infrared radiation detector the active junctions of which are coated with a thin continuous uniform coating of a dispersion of silicon carbide pigment particles substantially in the range of 5–25µ in a film-forming material.
3. A detector according to claim 1 in which the coating after solvent evaporation contains about 0.65 mg./cm.$^2$.

References Cited

UNITED STATES PATENTS

| | | | |
|---|---|---|---|
| 2,422,351 | 9/1950 | Egolf | 235—68 |
| 2,522,351 | 9/1950 | Egolf | 235—68 |
| 2,966,646 | 12/1960 | Baasch | 338—22 |
| 2,981,913 | 4/1961 | Barnes et al. | 338—18 |
| 3,267,403 | 8/1966 | Guarnieri | 338—22 |

OTHER REFERENCES

Hesse: "Fette and Seifen," vol. 55, No. 10 (1953), page 723. TP670A2C3.

Payne: "Organic Coating Technology," vol. II, 1961, pp. 711, 712, 713, 714, and 715. TP935P38.

Mattello: Protective and Decorative Coatings, "Uses of Titanium Pigments," 409, 410, vol. II (1942).

MORRIS LIEBMAN, *Primary Examiner.*

JULIUS FROME, *Examiner.*

A. KOECKERT, R. BARON, *Assistant Examiners.*